United States Patent
Choi et al.

(10) Patent No.: US 10,200,254 B2
(45) Date of Patent: Feb. 5, 2019

(54) METHODS AND SYSTEMS FOR IMPROVED COMPUTER NETWORK ANALYSIS

(71) Applicant: The Boeing Company, Huntington Beach, CA (US)

(72) Inventors: Jai J. Choi, Sammamish, WA (US); Kelly SeiYuda Bunn, Duvall, WA (US); Ryan D. Hammond, Seattle, WA (US)

(73) Assignee: The Boeing Company, Chicago, IL (US)

( * ) Notice: Subject to any disclaimer, the term of this patent is extended or adjusted under 35 U.S.C. 154(b) by 249 days.

(21) Appl. No.: 14/689,222

(22) Filed: Apr. 17, 2015

(65) Prior Publication Data

US 2016/0308729 A1 Oct. 20, 2016

(51) Int. Cl.
| | | |
|---|---|---|
| *G06F 17/30* | (2006.01) | |
| *H04L 12/24* | (2006.01) | |
| *H04L 12/26* | (2006.01) | |
| *H04L 29/06* | (2006.01) | |

(52) U.S. Cl.
CPC ........ *H04L 41/14* (2013.01); *G06F 17/30864* (2013.01); *H04L 43/026* (2013.01); *H04L 63/1408* (2013.01); *H04L 43/12* (2013.01)

(58) Field of Classification Search
CPC . H04L 41/14; H04L 43/026; G06F 17/30864; G06F 8/31
USPC .................... 709/224; 370/235–236; 717/105
See application file for complete search history.

(56) References Cited

U.S. PATENT DOCUMENTS

| | | | | |
|---|---|---|---|---|
| 8,817,625 | B1* | 8/2014 | Zhang | H04L 41/5045 370/235 |
| 2007/0192863 | A1* | 8/2007 | Kapoor | G06F 9/505 726/23 |
| 2009/0147679 | A1* | 6/2009 | Gusat | H04L 47/10 370/232 |
| 2012/0266129 | A1* | 10/2012 | Massoudi | G06F 8/31 717/105 |

OTHER PUBLICATIONS

Shaonan Wang, FlowRank: Ranking NetFlow Records, Jun. 28-Jul. 2, 2010, ACM, 978-1-4503-0062-9, pp. 484-488.*

(Continued)

*Primary Examiner* — David R Lazaro
*Assistant Examiner* — Zi Ye
(74) *Attorney, Agent, or Firm* — Armstrong Teasdale LLP

(57) ABSTRACT

A computer-implemented method for determining service flow rank based on service flow dependency is provided. The method includes receiving a plurality of data flow information for a plurality of data flows. Each data flow of the plurality of data flows includes a source, a destination, a start time, and an associated service. The method also includes determining a plurality of dependency sets based on the plurality of data flow information. Each dependency set of the plurality of dependency sets includes at least a first data flow and a second data flow. The method further includes calculating a plurality of dependency strengths based on the plurality of dependency sets, calculating a plurality of total service scores based on the first data flows of the plurality of dependency sets, and calculating a plurality of service flow ranks based on the plurality of dependency strengths and the plurality of total service scores.

20 Claims, 6 Drawing Sheets

(56) References Cited

OTHER PUBLICATIONS

Wang, Shaonan et al.; FlowRank: Ranking NetFlow Records; IWCMC 10; Proceedings of the 6th International Wireless Communications and Mobile Computing Conference; 2010; pp. 484-488.
Sawilla, Reginald E. et al.; Identifying Critical Attack Assets in Dependency Attack Graphs; ESORICS 08; Proceedings of the 13th European Symposium on Research in Computer Security: Computer Security; 2008; pp. 18-34.
Cam, Hasan et al.; Mission-Aware Time-Dependent Cyber Asset Criticality and Resilience; CSIIRW 13; Proceedings of the Eighth Annual Cyber Security and Information Intelligence Research Workshop; Article No. 12; 2013; 4 pp.
Kind, Andreas et al.; Relationship Discovery with NetFlow to Enable Business-Driven IT Management; Proceedings of the 2006 IEEE/IFIP Business Driven IT Management (BDIM) Conference; Apr. 2006; pp. 63-70.

\* cited by examiner

METHODS AND SYSTEMS FOR IMPROVED COMPUTER NETWORK ANALYSIS

BACKGROUND

The field of the present disclosure relates generally to analyzing computer networks and, more specifically, to determining service flow ranks based on the flow dependencies of data flow in view of the services associated with those data flows.

Computer networks are vulnerable to malicious attacks. Detecting current or prior attacks (or intrusions) requires in-depth knowledge of the network data flows in the system. Data flows represent the paths that packets of data travel when the packets are transmitted from one computer system to another computer system. One important aspect of knowing the data flows in a network is the dependencies among network data flows. For example if a computer system or device receives a first data flow and then that computer system transmits a second data flow in response, that second data flow is dependent on the first. Determining this dependency is important to know which data flows are related to each other. Known techniques for determining data flows utilize the following fields: source IP address, destination IP address, port numbers, and flow timing, among other data fields.

Cyber mission assurance requires service availability even if cyber-attacks impair computer network systems, and consequently missions. Additionally, the importance of different data flows may change depending on the mission or applications running on one or more computer systems within the network. By identifying critical services and service dependencies of network assets in relation to specific missions, automated courses of action and control policies can be implemented.

BRIEF DESCRIPTION

In one aspect, a computer-implemented method for determining service flow rank based on service flow dependency is provided. The method is implemented using a flow ranking computer device in communication with a memory. The method includes receiving a plurality of data flow information for a plurality of data flows. Each data flow of the plurality of data flows includes a source, a destination, a start time, and an associated service. The method also includes determining a plurality of dependency sets based on the plurality of data flow information. Each dependency set of the plurality of dependency sets includes at least a first data flow and a second data flow. The method further includes calculating a plurality of dependency strengths based on the plurality of dependency sets, calculating a plurality of total service scores based on the first data flows of the plurality of dependency sets, and calculating a plurality of service flow ranks based on the plurality of dependency strengths and the plurality of total service scores.

In another aspect, a flow ranking computer system used to determine service flow rank based on service flow dependency is provided. The FR computer system includes a processor coupled to a memory device. The processor is programmed to receive a plurality of data flow information for a plurality of data flows. Each data flow of the plurality of data flows includes a source, a destination, a start time, and an associated service. The processor is also programmed to determine a plurality of dependency sets based on the plurality of data flow information. Each dependency set of the plurality of dependency sets includes at least a first data flow and a second data flow. The processor is further programmed to calculate a plurality of dependency strengths based on the plurality of dependency sets, calculate a plurality of total service scores based on the first data flows of the plurality of dependency sets, and calculate a plurality of service flow ranks based on the plurality of total dependency strengths and the plurality of total service scores.

In yet another aspect, at least one non-transitory computer-readable storage media having computer-executable instructions embodied thereon is provided. When executed by at least one processor, the computer-executable instructions cause the at least one processor to receive a plurality of data flow information for a plurality of data flows. Each data flow of the plurality of data flows includes a source, a destination, a start time, and an associated service. The computer-executable instructions also cause the at least one processor to determine a plurality of dependency sets based on the plurality of data flow information. Each dependency set of the plurality of dependency sets includes at least a first data flow and a second data flow. The computer-executable instructions further cause the at least one processor to calculate a plurality of dependency strengths based on the plurality of dependency sets, calculate a plurality of total service scores based on the first data flows of the plurality of dependency sets, and calculate a plurality of service flow ranks based on the plurality of dependency strengths and the plurality of total service scores.

DETAILED DESCRIPTION

Figure 1:
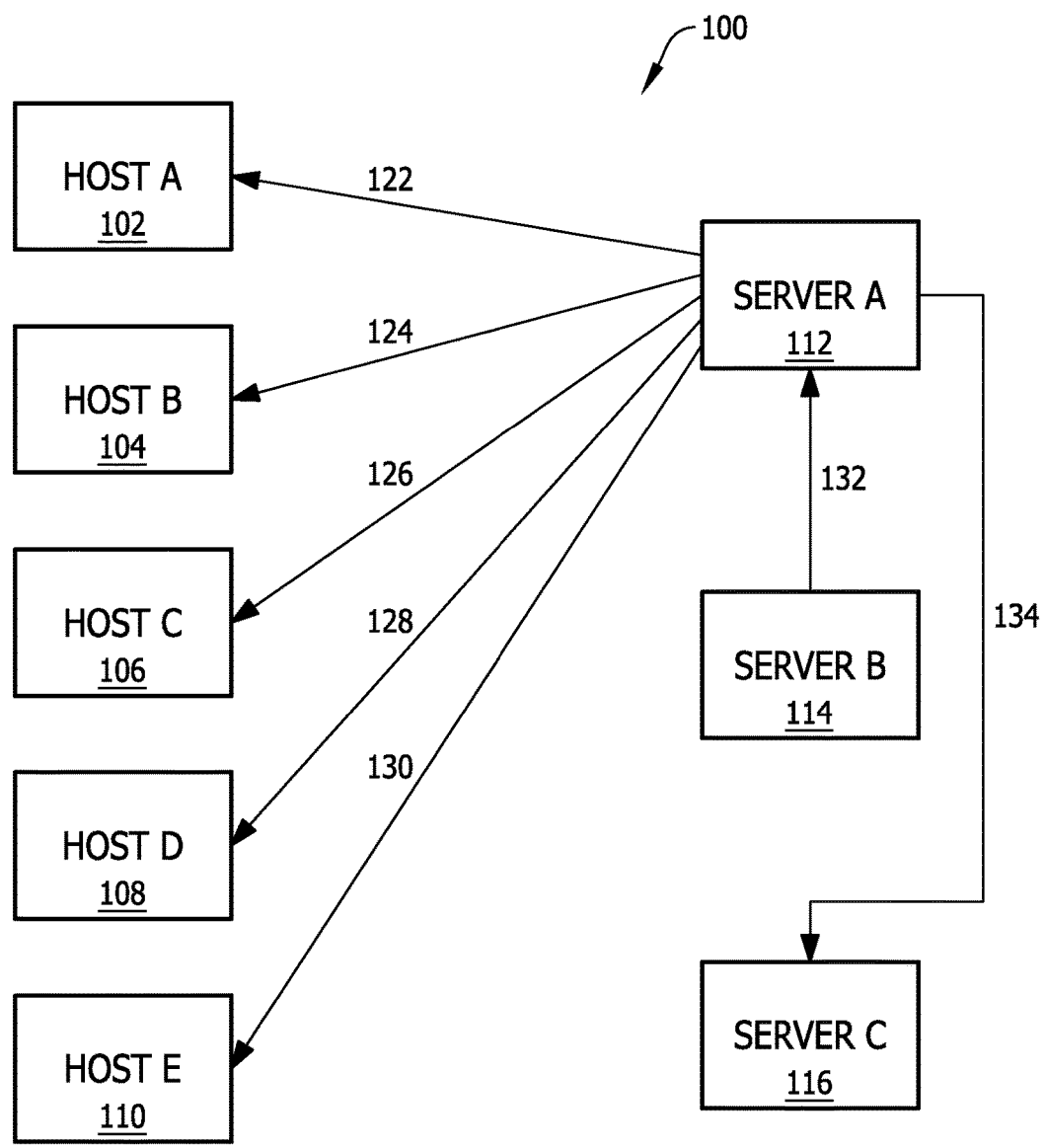
FIG. 1 illustrates an example computer network 100 in accordance with one embodiment of the present disclosure.

The implementations described herein relate to systems and methods for analyzing computer networks. More specifically, a flow ranking ("FR") computer system receives a plurality of data flow information for a plurality of data flows between components in a computer network. In some embodiments, the plurality of data flow information is gathered by a software tool that includes for each data flow the source IP address of the data flow, the destination IP address of the data flow, and the service rendered by the data flow. The FR computer system augments the data flow with the start time of when the data flow stated transferring between the source IP address and the destination IP address. The FR computer system determines equivalent data flows from the plurality of data flows. Equivalent data flows have the same source IP address, the same destination IP address, and the same associated service. The FR computer system will determine a number of scenarios from the data flows, where each scenario includes a first data flow, and may include one or more secondary data flows. More specifically, using these equivalent data flows, the FR computer system determines separate scenarios for the equivalent data flows. The FR computer system determines when a first data flow of the equivalent data flows occurs and starts a scenario for that data flow at that point. The FR computer system ends the scenario after a predetermined period of time. The FR computer system generates a new scenario, with a length equal to the predetermined period of time, every time that the first data flow occurs outside of an existing scenario time window. The FR computer system determines every data flow that has a source IP address equal to the destination IP address of the first data flow that starts within the scenario. The secondary data flows in the scenario are considered to be dependent on the first data flow which starts the scenario. Then the FR computer system calculates the strength of the dependency between the first data flow and each of the secondary data flows by calculating the time gap which is defined as the difference in start time between the first data flow and the secondary data flows. The FR computer system adds together the dependency strengths for each combination of a first data flow and a secondary data flow.

The FR computer system also stores a plurality of service scores for different data flows during different services. The FR computer system calculates a total service score for each scenario based on the service score of each data flow in the scenario. The FR computer system combines the total service scores for the scenarios with the same first data flow. The FR computer system combines the total service scores with the dependency strengths to determine a service flow ranking of the data flows. This service flow ranking of the data flows can be used to create a resource dependency map of the computer network or to monitor mission critical assets and their dependencies to determine attack mitigation strategy under cyber-attack.

Described herein are computer systems such as FR computer system and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 illustrates an example computer network 100 in accordance with one embodiment of the present disclosure. Computer network 100 includes a plurality of hosts A-E 102, 104, 106, 108, and 110. Computer network 100 also includes a plurality of servers A-C 112, 114, and 118. Between these hosts and servers are a plurality of data flows: 122, 124, 126, 128, 130, 132, and 134. While only seven data flows are shown in FIG. 1, this figure only shows a portion of the potential data flows between the different components of computer network 100. The data flows shown between the components of computer network 100 illustrate a subset of the potential flows and will be used below to illustrate the present disclosure.

Figure 2:
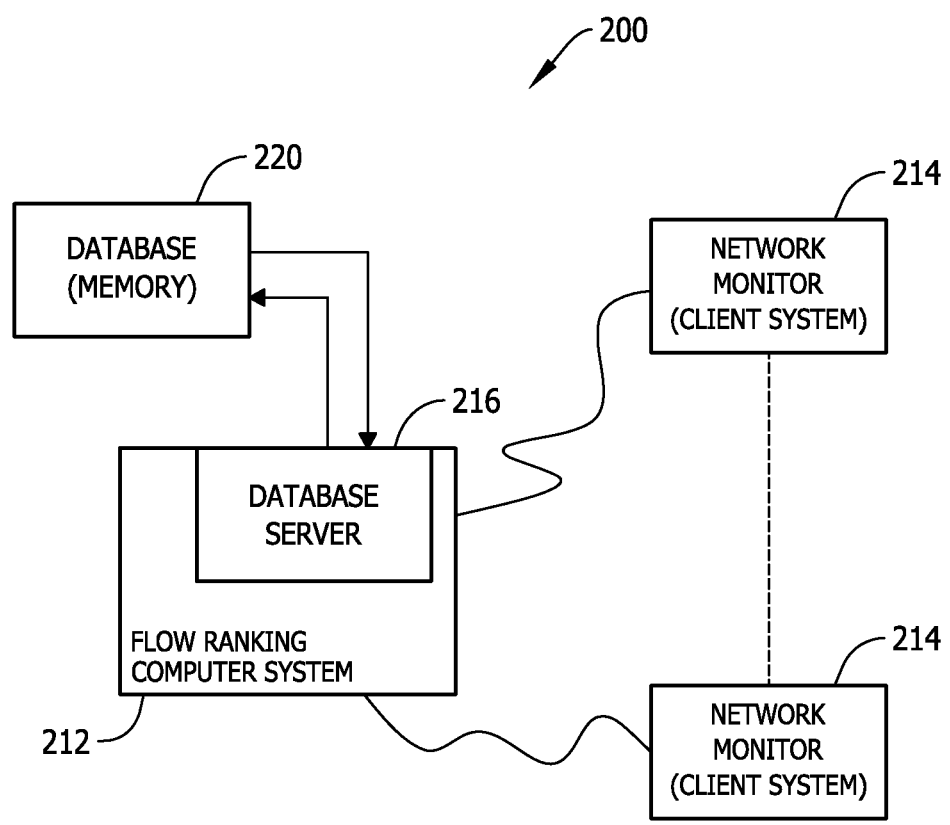
FIG. 2 is a simplified block diagram of an example system for analyzing computer networks in accordance with one embodiment of the present disclosure.

FIG. 2 is a simplified block diagram of an example system for analyzing computer networks in accordance with one embodiment of the present disclosure. System 200 includes a flow ranking ("FR") computer system 212 configured to analyze computer networks by determining service flow ranks based on the flow dependencies of data flow in view of the services associated with those data flows. As described below in more detail, FR computer system 212 is configured to receive a plurality of data flow information for a plurality of data flows, determine a plurality of dependency sets based on the plurality of data flow information wherein each dependency set of the plurality of dependency sets includes at least a first data flow and a second data flow, calculate a plurality of dependency strengths based on the plurality of dependency sets, calculate a plurality of total service scores based on the first data flows of the plurality of dependency sets, and calculate a plurality of service flow ranks based on the plurality of dependency strengths and the plurality of total service scores.

System 200 also includes one or more network monitors 214 (also known as client systems) that monitor the data flows of computer network 100. In some embodiments, network monitors 214 monitor the data flows in real-time using a software program such as NetFlow. In other embodiments, network monitors 214 monitor the data flows by comparing logs or other resources of the various components of computer network 100. In some embodiments, each network monitor 214 monitors a different computer network 100. In other embodiments, network monitors 214 monitor different or overlapping sections of the same computer network 100. Network monitors 214 are computers that include a web browser or a software application, which enables network monitors 214 to access FR computer system 212. For example, network monitors 214 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Network monitors 214 can be any device capable of accessing the Internet including, but not limited to, a desktop computer, a laptop computer, a personal digital assistant (PDA), a cellular phone, a smartphone, a tablet, a phablet, or other web-based connectable equipment.

A database server 216 is communicatively coupled to a database 220 that stores data. In one embodiment, database 220 includes data flow information, calculating rules and settings, and service rank scores for different services. In the example embodiment, database 220 is stored remotely from FR computer system 212. In some embodiments, database 220 is decentralized. In the example embodiment, a person can access database 220 via network monitors 214 by logging onto FR computer system 212, as described herein.

Figure 3:
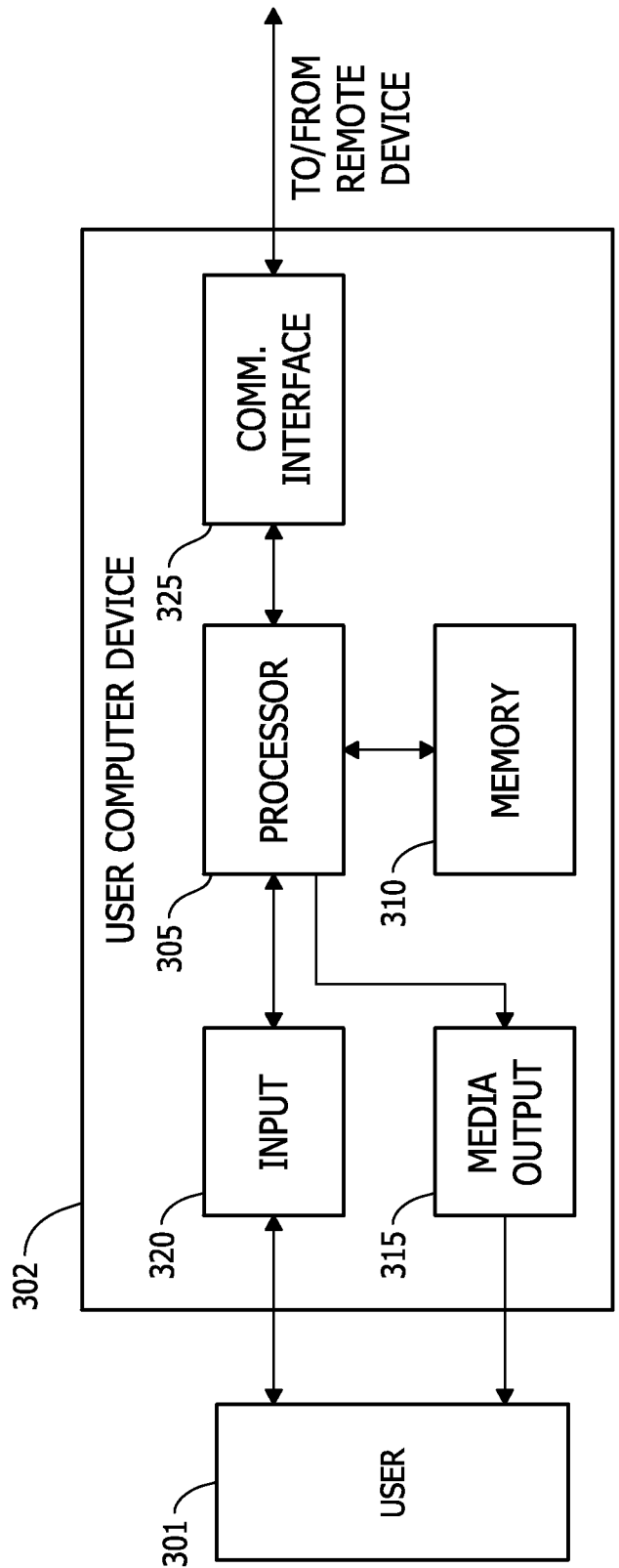
FIG. 3 illustrates an example configuration of a host shown in FIG. 1 or a network monitor shown in FIG. 2, in accordance with one embodiment of the present disclosure.

FIG. 3 illustrates an example configuration of host A 102 shown in FIG. 1 or a network monitor 214 shown in FIG. 2, in accordance with one embodiment of the present disclosure. User computer device 302 is operated by a user 301. User computer device 302 may include, but is not limited to, network monitor 214 and hosts A-E 102, 104, 106, 108, and 110 (all shown in FIG. 1). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as server A 112 (shown in FIG. 1). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website. A client application allows user 301 to interact with, for example, server A 112. For example, instructions may be stored by a cloud service, and the output of the execution of the instructions sent to the media output component 315.

Figure 4:
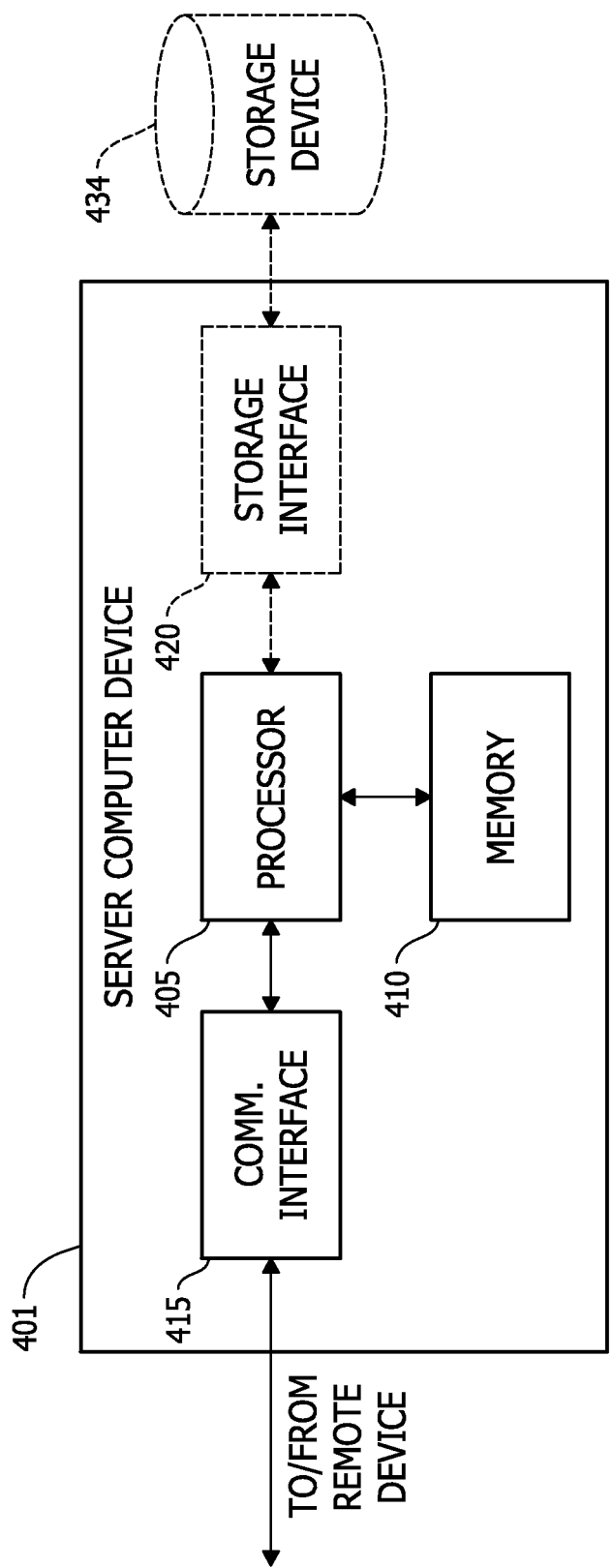
FIG. 4 illustrates an example configuration of a server shown in FIG. 1, in accordance with one embodiment of the present disclosure.

FIG. 4 illustrates an example configuration of server A 112 shown in FIG. 1, in accordance with one embodiment of the present disclosure. Server computer device 401 may include, but is not limited to, servers A-C 112, 114, and 116 (shown in FIG. 1), FR computer system 212, and database server 216 (both shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, hosts A-E 102, 104, 106, 108, and 110 (shown in FIG. 1), servers A-C 112, 114, and 116, network monitor 214, or FR computing device 212 (both shown in FIG. 2). For example, communication interface 415 may receive requests from network monitor 214, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instruction such as those illustrated in FIGS. 5 and 6.

Figure 5:
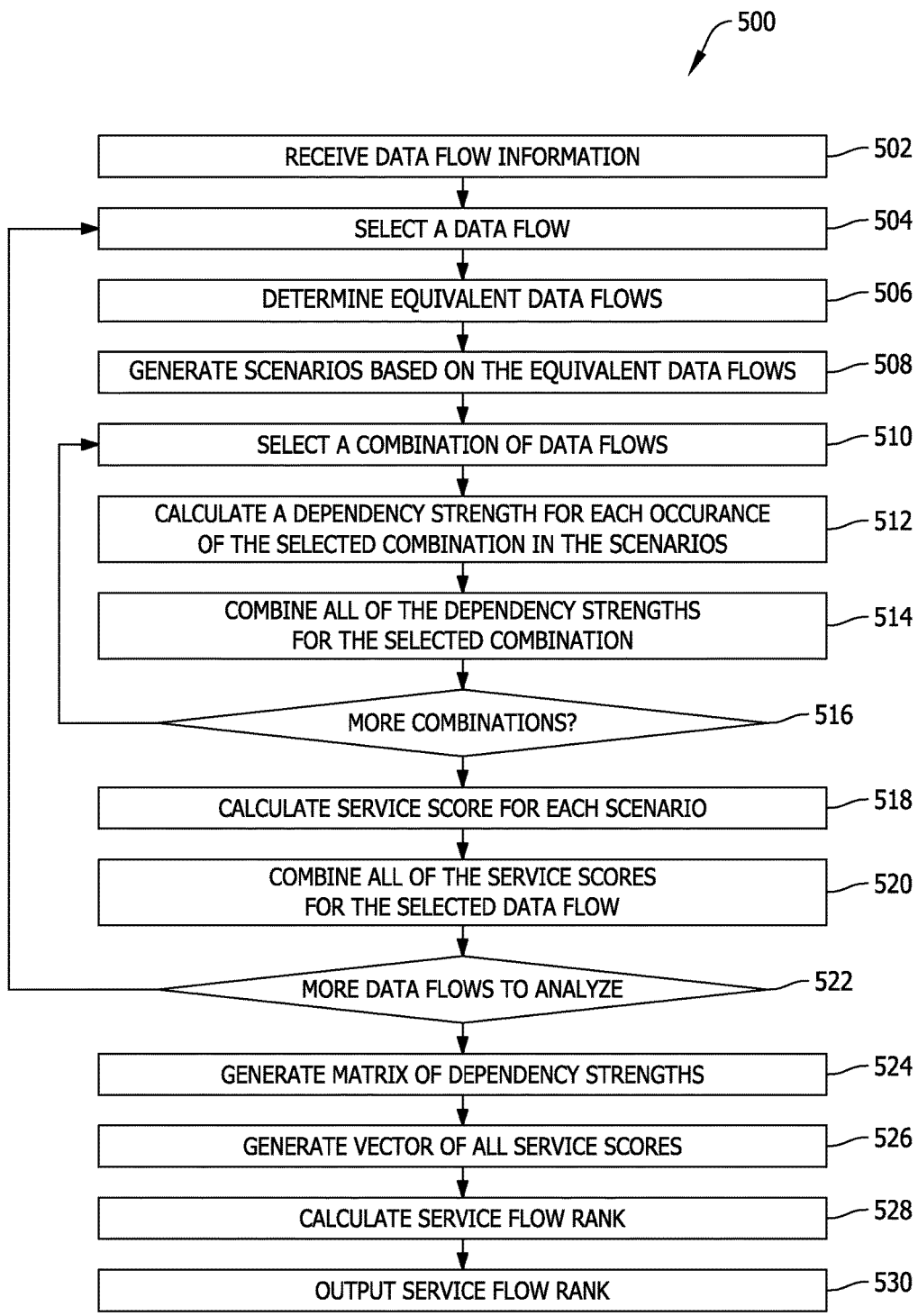
FIG. 5 is a flow chart of a process for determining service flow ranks based on the flow dependencies of data flows (as shown in FIG. 1) in view of the services associated with those data flows based on the system shown in FIG. 2.

FIG. 5 is a flow chart of a process 500 for determining service flow ranks based on the flow dependencies of data flows (as shown in FIG. 1) in view of the services associated with those data flows based on the system shown in FIG. 2. Process 500 may be implemented by a computing device, for example FR computer system 212 (shown in FIG. 2).

In the example embodiment, FR computer system 212 receives 502 data flow information from network monitors 214 (shown in FIG. 2). As described above, network monitors 214 provide data flow information about data flows between different components of data network 100, shown in FIG. 1. In some embodiments, network monitor 214 gathers the data flow information from the headers of packets traveling between the different components of computer network 100. In other embodiments, network monitor 214 gathers the data flow information from log files from the different components of computer network 100. The basic data flow information for each data flow includes the source IP address, the destination IP address, and the service associated with the data flow. Services may include, but are not limited to, SSH, FTP, MIME, Kerberos, LDAP, DHCP, DNS, IMAP, POP3, SNMP, HTTP, HTTPS, NTP, SMTP, SMS, SSL, IRC, NFS, SMB, BQP, and Telnet. Missions (also known as tasks) are specific activities of computer network 100, such as, but not limited to, data acquisition/storage or file sharing. In the example embodiment, network monitor 214 also augments the data flow information with the start time of each data flow.

FR computer system 212 selects 504 a data flow. For example, using computer network 100, FR computer system 212 may select data flow 132 from Server B 114 to Server A 112 (all shown in FIG. 1). For this selected data flow 132, FR computer system 212 determines the source (Server B 114), the destination (Server A 112), the associated service, and the start time $t(1)_1$. FR computer system 212 compares the selected data flow 132 to the other data flows in the data flow information to determine 506 equivalent data flows. An equivalent data flow has the same source, destination, and associated service as the selected data flow 132. Using the equivalent flows, FR computer system 212 generates 508 scenarios. Each scenario includes the data flows that have as a source the destination of the selected data flow 132 and occur within a predetermined period of time after the selected data flow 132. In this example, data flows 122, 124, 126, 128, 130, and 134 all have Server A 112 as their source. Each scenario contains the data flows that transmit from Server A 112 within a predetermined period of time. After the predetermined period of time, FR computer system 212 generates 508 another scenario for each time that an equivalent data flow occurs, as illustrated in Table 1.

TABLE 1

| Flow ID | Source | Destination | Service | Start Time |
|---|---|---|---|---|
| Scenario 1 | | | | |
| Flow 1 (132) | Server B | Server A | 4 | $t(1)_1$ |
| Flow 2 (122) | Server A | Host A | 2 | $t(1)_{12}$ |
| Flow 3 (124) | Server A | Host B | 1 | $t(1)_{13}$ |
| Flow 4 (126) | Server A | Host C | 2 | $t(1)_{14}$ |
| Scenario 2 | | | | |
| Flow 1 (132) | Server B | Server A | 4 | $t(2)_1$ |
| Flow 5 (128) | Server A | Host D | 1 | $t(2)_{15}$ |
| Flow 2 (122) | Server A | Host A | 2 | $t(2)_{12}$ |
| Flow 7 (134) | Server A | Server C | 3 | $t(2)_{17}$ |
| Flow 4 (126) | Server A | Host C | 2 | $t(2)_{14}$ |
| Scenario 3 | | | | |
| Flow 1 | Server B | Server A | 4 | $t(3)_1$ |
| Flow 4 (126) | Server A | Host C | 2 | $t(3)_{14}$ |
| Flow 2 (122) | Server A | Host A | 2 | $t(3)_{12}$ |
| Flow 7 (134) | Server A | Server C | 3 | $t(3)_{17}$ |

As shown above in Table 1, there are three scenarios. Scenario 1 began at time $t(1)_1$ and includes multiple flows. Each of those flows is in order of start time and starts at a different time. For example, Flow 2 (122) starts at time $t(2)_{12}$ which is before Flow 4 (126) at $t(1)_{14}$. In Scenario 3, Flow 4 (126) occurs before Flow 2 (122).

FR computer system 212 selects 510 a combination of data flows. For example, FR computer system 212 may select 510 Flow 1 (132) followed by Flow 2 (122). Since Flow 1 (132) occurs before Flow 2 (122), Flow 2 (122) may be dependent on Flow 1 (132). To determine the strength of the dependency, FR computer system 212 calculates the dependency strength based on the difference in starting times. In the example embodiment, FR computer system 212 uses Equation 1.

$$P(f1, f2) = e^{-(t(1)_{12} - t(1)_1)} \qquad \text{Equation 1}$$

wherein P(f1, f2) is the strength of the dependency between Flow 1 (132) and Flow 2 (112) in Scenario 1.

For each occurrence of that combination of data flows, Flow 1 (132) followed by Flow 2 (122), FR computer system 212 calculates 512 the dependency strength using Equation 1. FR computer system 212 combines 514 all of the dependency strengths together for the selected combination. In the example embodiment, the result is $P_{SUM}$(f1, f2). FR computer system 212 determines 516 if there are more combinations available. If there are, FR computer system 212 selects 510 another combination of data flows from the generated scenarios, for example Flow 1 (132) followed by Flow 3 (124). At this point, the first flow will always be Flow 1 (132) because it is the selected data flow. FR computer system 212 continues to cycle through these steps until all of the combinations of the selected data flow followed by a different data flow that are in at least one of the scenarios have been selected. If there are no more combinations available in the scenarios, then FR computer system 212 calculates 518 a service score for each generated scenario. If two flows have a different service, they are considered to be different flows. A distinct flow is defined as a tuple <srcIP, dstIP, service>)

For each potential mission or task, FR computer system 212 stores relevancy values for the associated services. These relevancy values represent how relevant the particular service is to a defined mission. These relevancy values are predetermined by subject matter experts or mission owners and stored by FR computer system 212 in database 220 (shown in FIG. 1). In the example embodiment, the relevancy values range in value from 0 to 1, but may be any range set by the mission owner or subject matter expert. In some embodiments, the mission that is being analyzed is chosen by the user in advance. In other embodiments, FR computer system 212 cycles through process 500 for a plurality of missions, determining service flow ranks for each mission. Ones skilled in the art would understand programming methods that would allow for shortcutting this process, such as, but not limited to, cycling through the different (available or selected) mission at this stage of process 500.

For each scenario associated with the selected data flow 132, FR computer system 212 assigns the respective relevancy value to each data flow based on the service associated with that data flow. FR computer system 212 calculates 518 a service score for a scenario by combining the relevancy values for the different data flows in that scenario. FR computer system 212 combines 520 all of the service scores for the selected data flow to determine a total service score for the selected data flow 132.

FR computer system 212 determines 522 if there are more data flows to examine. If there are more data flows to examine, then FR computer system 212 selects 504 a different data flow. FR computer system 212 continues to cycle through Steps 502 through 522 until all of the data flows are analyzed. In the above example, the next data flow that FR computer system 212 analyzes may be Flow 2 (122) or FR computer system 212 may analyze Flow 1 (132) again, but for a different associated service. In the example embodiment, Flow 1 (132) may be analyzed multiple times, each time for a different service.

Once FR computer system 212 has determined that there are no more data flows to analyze, FR computer system 212 generates 524 a matrix of dependency strengths. The matrix of dependency strengths is populated by the dependency strengths for the selected combinations as combined in Step 514, such as $P_{SUM}$(f1, f2). Each axis of the matrix lists the distinct flows. An example portion of the matrix is below in Table 2.

TABLE 2

| FLOW ID | Flow 1 (132) | Flow 2 (122) |
|---|---|---|
| Flow 1 (132) | 0 | $P_{SUM}$ (f1, f2) |
| Flow 2 (122) | $P_{SUM}$ (f2, f1) | 0 |

FR computer system 212 generates 526 a vector of all of the total service flows for all of the data flows. The vector includes the data flows in the same order as the matrix. FR computer system 212 calculates 528 the Service Flow Rank for the plurality of data flows and the selected mission. In the example embodiment, FR computer system 212 calculates 528 the Service Flow Rank by solving for the principal eigenvector R shown in Equation 2:

$$R = d*M^T R + (1-d)K \qquad \text{Equation 2}$$

where R is the Service Flow Rank vector, M is the matrix of dependency strengths (Table 2), K is the vector of all total service flows, and d is a damping factor that is set in advance (typically 0.85), T stands for transpose of matrix.

In the example embodiment, FR computer system 212 continues to iterate to solve for eigenvector R through the following process. Initially, at iteration t=0, R is initialized as a column vector $$R_o = \frac{1}{C}[1, 1, \ldots, 1]^T$$

where C is the number of distinct flows and set t=1. Then the following two steps are repeated until R converges. Step 1: $R_t \Leftarrow d*M^T*R_{t-1} + (1-d)*K$, then Step 2

$$R_t \Leftarrow \frac{1}{\|R_t\|_1} R_t,$$

where $\|R_t\|_1$ represents L1 norm which is the sum of all of the elements in the column vector. Then increase t←t+1. FR computer system 212 stops when the difference $|R_t - R_{t-1}| \leq \varepsilon$, where ε is a predetermined convergence threshold.

Then FR computer system 212 outputs 530 the Service Flow Rank to the user. In some embodiments, FR computer system 212 may generate a network connection map based on the Service Flow Rank. In other embodiments, FR computer system 212 may use the Service Flow Rank to manage mission assurance. For example the flows identified with high scores are considered mission critical flows that can be further monitored for assets utilization, resource management and risk analysis. In addition, the dependent flows and associated resources can be used to generate dependency graphs and attack graphs. These tools are valuable sources for mission assurance whereby users need to sustain mission even under deteriorating circumstances.

Figure 6:
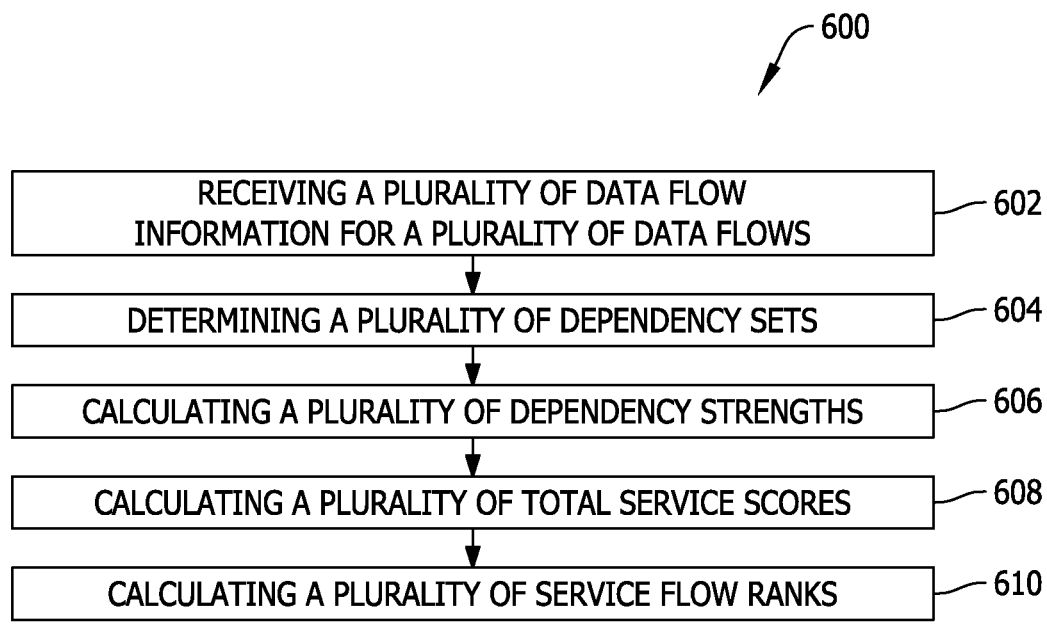
FIG. 6 is a simplified flow chart of a process for determining service flow ranks based on the flow dependencies of data flows (as shown in FIG. 1) in view of the services associated with those data flows based on the system shown in FIG. 2.

FIG. 6 is a simplified flow chart of a process 600 for determining service flow ranks based on the flow dependencies of data flows (as shown in FIG. 1) in view of the services associated with those data flows based on the system shown in FIG. 2. Process 600 may be implemented by a computing device, for example FR computer system 212 (shown in FIG. 2).

FR computer system 212 receives 602 a plurality of data flow information for a plurality of data flows. FR computer system 212 determines 604 a plurality of dependency sets for the plurality of data flows based on the plurality of data flow information. FR computer system 212 calculates 606 a plurality of dependency strengths for the plurality of dependency sets. FR computer system 212 calculates 608 a plurality of total service scores. FR computer system 212 calculates 610 a plurality of service flow ranks based on the plurality of dependency strengths and the plurality total service scores.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The implementations described herein relate to systems and methods for analyzing computer networks and, more specifically, to determining service flow ranks based on the flow dependencies of data flow in view of the services associated with those data flows. More specifically, a flow ranking ("FR") computer system receives a plurality of data flow information for a plurality of data flows between components in a computer network. In some embodiments, the plurality of data flow information is gathered by a software tool that includes for each data flow the source IP address of the data flow, the destination IP address of the data flow, and the service rendered by the data flow. The FR computer system augments the data flow with the start time when the data flow stated transferring between the source IP address and the destination IP address. The FR computer system determines equivalent data flows from the plurality of data flows. Equivalent data flows have the same source IP address, the same destination IP address, and the same associated service. Using these equivalent data flows, the FR computer system determines separate scenarios for the equivalent data flows. The FR computer system determines when a first data flow of the equivalent data flows occurs and starts building a scenario for that data flow at that point. The FR computer system ends the scenario after a predetermined period of time. The FR computer system generates a new scenario, with a length equal to the predetermined period of time, every time that the first data flow occurs outside of a scenario. The FR computer system determines every data flow that has a source IP address equal to the destination IP address of the first data flow that starts within the scenario. The secondary data flows in the scenario are considered to be dependent on the first data flow, which starts the scenario. Then the FR computer system calculates the strength of the dependency between the first data flow and each of the secondary data flows by calculating the difference in start time between the first data flow and the secondary data flows. The FR computer system adds together the dependency strengths for each combination of a first data flow and a secondary data flow.

The FR computer system also stores a plurality of service scores for different data flows. The FR computer system calculates a total service score for each scenario based on the service score of each data flow in the scenario. The FR computer system combines the total service scores for the scenarios with the same first data flow. The FR computer system uses the total service scores and the total dependency strengths to determine a service flow ranking of the data flows. This service flow ranking of the data flows may be used to analyze the assets of the computer network or to monitor dependent data flows to prioritize resource protection when a cyber-attack may be occurring.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for determining service flow rank based on service flow dependency, the method implemented using a flow ranking ("FR") computer device in communication with a memory, the method comprising:

receiving a plurality of data flow information for a plurality of data flows, wherein each data flow of the plurality of data flows includes a source, a destination, a start time, and an associated service;

determining a plurality of dependency sets based on the plurality of data flow information, wherein each dependency set of the plurality of dependency sets includes at least a first data flow and a subsequent second data flow;

calculating a dependency strength based on each of the plurality of dependency sets;

sorting the plurality of dependency sets into service subsets based on the associated services of the first data flow in the each dependency set, wherein each service subset is associated with a single service, and wherein each service subset only includes dependency sets where the first data flow of the dependency set is associated with the single service;

for each of a plurality of scenarios, determining a relevancy value for each service subset based on the corresponding scenario;

calculating a service score for each scenario based on the relevancy value, the relevancy values associated with the plurality of dependency sets in the scenario;

calculating a plurality of total service scores for each of the service subsets based on the service score that correspond to each of the first data flows of the plurality of dependency sets in the scenario;

calculating a plurality of service flow ranks based on the dependency strength of each of the plurality of dependency sets and the plurality of total service scores;

determining, for a current mission, one or more critical data flows based on the plurality of service flow ranks;

monitoring, in real-time, a computer network including a plurality of computer devices for the one or more critical data flows of the plurality of data flows based on the plurality of service flow ranks; and initiating one or more automated courses of action based on the one or more critical data flows.

2. A method in accordance with claim 1, wherein a data flow represents one or more data packets flowing from one component of a computer network to another component of the computer network.

3. A method in accordance with claim 1, wherein determining a plurality of dependency sets further comprises determining a plurality of data flow sets, wherein the second data flow occurs after the first data flow, wherein a destination of the first data flow is the source of the second data flow, and wherein the first data flow and the second data flow occur within a predetermined time period.

4. A method in accordance with claim 1, wherein calculating dependency strength further comprises:
for each dependency set, calculating a difference between the start time of the first data flow and the start time of the second data flow;
determining a plurality of equivalent data flow sets based on dependency sets where the source, the destination, and the service of each of the first flows is the same as the source, the destination, and the service of a first flow of each of the plurality of equivalent data flows sets; and
calculating the dependency strength for the plurality of equivalent data flow sets based on the calculated differences in start time of each equivalent data flow set.

5. A method in accordance with claim 1, wherein calculating a plurality of total service scores further comprises:
receiving a plurality of service score sets, wherein each service score set of the plurality of service score sets includes a relevancy score for each data flow based on an associated service; and
for each first data flow, calculating a total service score based on the dependency sets associated with that first data flow.

6. A method in accordance with claim 1, wherein calculating a plurality of service flow ranks further comprises calculating a service flow rank for each dependency set based on the associated total service score and the dependency strength of the dependency set.

7. A method in accordance with claim 1, further comprising generating a resource dependency map for a computer network based on the plurality of service flow ranks.

8. A flow ranking ("FR") computer system used to determine service flow rank based on service flow dependency, said FR computer system comprising:
a memory device; and
a processor coupled to said memory device, wherein said processor is programmed to:
receive a plurality of data flow information for a plurality of data flows, wherein each data flow of the plurality of data flows includes a source, a destination, a start time, and an associated service;
determine a plurality of dependency sets based on the plurality of data flow information, wherein each dependency set of the plurality of dependency sets includes at least a first data flow and a subsequent second data flow;
calculate a dependency strength based on each of the plurality of dependency sets;
sort the plurality of dependency sets into service subsets based on the associated services of the first data flow in the each dependency set, wherein each service subset is associated with a single service, and wherein each service subset only includes dependency sets where the first data flow of the dependency set is associated with the single service;
for each of a plurality of scenarios, determine a relevancy value for each service subset based on the corresponding scenario;
calculate a service score for each scenario based on the relevancy value, the relevancy values associated with the plurality of dependency sets in the scenario;
calculate a plurality of total service scores for each of the service subsets based on the service score that correspond to each of the first data flows of the plurality of dependency sets in the scenario;
calculate a plurality of service flow ranks based on the dependency strength of each of the plurality of dependency sets and the plurality of total service scores;
determine, for a current mission, one or more critical data flows based on the plurality of service flow ranks;
monitor, in real-time, a computer network including a plurality of computer devices for the one or more critical data flows of the plurality of data flows based on the plurality of service flow ranks; and
initiate one or more automated courses of action based on the one or more critical data flows.

9. The FR computer system of claim 8, wherein a data flow represents one or more data packets flowing from one component of a computer network to another component of the computer network.

10. The FR computer system of claim 8, wherein the at least one processor is further programmed to determine a plurality of dependency sets further comprises determining a plurality of data flow sets, wherein the second data flow occurs after the first data flow, wherein a destination of the first data flow is the source of the second data flow, and wherein the first data flow and the second data flow occur within a predetermined time period.

11. The FR computer system of claim 8, wherein the at least one processor is further programmed to:
for each dependency set, calculate a difference between the start time of the first data flow and the start time of the second data flow;
determine a plurality of equivalent data flow sets based on dependency sets where the source, the destination, and the service of each of the first flows is the same as the source, the destination, and the service of a first flow of each of the plurality of equivalent data flow sets; and
calculate the dependency strength for the plurality of equivalent data flow sets based on the calculated differences in start time of each equivalent data flow set.

12. The FR computer system of claim 8, wherein the at least one processor is further programmed to:
receive a plurality of service score sets, wherein each service score set of the plurality of service score sets includes a relevancy score for each data flow based on an associated service; and
for each first data flow, calculate a total service score based on the dependency sets associated with that first data flow.

13. The FR computer system of claim 8, wherein the at least one processor is further programmed to calculate a service flow rank for each dependency set based on the associated total service score and the dependency strength of the dependency set.

14. The FR computer system of claim 8, wherein the at least one processor is further programmed to display a dependency flow diagram for a computer network based on the plurality of service flow ranks.

15. At least one non-transitory computer-readable storage media having computer-executable instructions embodied thereon, wherein when executed by at least one processor, the computer-executable instructions cause the at least one processor to:
- receive a plurality of data flow information for a plurality of data flows, wherein each data flow of the plurality of data flows includes a source, a destination, a start time, and an associated service;
- determine a plurality of dependency sets based on the plurality of data flow information, wherein each dependency set of the plurality of dependency sets includes at least a first data flow and a subsequent second data flow;
- calculate a dependency strength based on each of the plurality of dependency sets;
- sort the plurality of dependency sets into service subsets based on the associated services of the first data flow in the each dependency set, wherein each service subset is associated with a single service, and wherein each service subset only includes dependency sets where the first data flow of the dependency set is associated with the single service;
- for each of a plurality of scenarios, determine a relevancy value for each service subset based on the corresponding scenario;
- calculate a service score for each scenario based on the relevancy value, the relevancy values associated with the plurality of dependency sets in the scenario;
- calculate a plurality of total service scores for each of the service subsets based on the service score that correspond to each of the first data flows of the plurality of dependency sets in the scenario;
- calculate a plurality of service flow ranks sets the plurality of total service scores;
- determine, for a current mission, one or more critical data flows based on the plurality of service flow ranks;
- monitor, in real-time, a computer network including a plurality of computer devices for the one or more critical data flows of the plurality of data flows based on the plurality of service flow ranks; and
- initiate one or more automated courses of action based on the one or more critical data flows.

16. The computer-readable storage media of claim 15, wherein a data flow represents one or more data packets flowing from one component of a computer network to another component of the computer network.

17. The computer-readable storage media of claim 15, wherein the computer-executable instructions further cause the at least one processor to determine a plurality of dependency sets further comprises determining a plurality of data flow sets, wherein the second data flow occurs after the first data flow, wherein a destination of the first data flow is the source of the second data flow, and wherein the first data flow and the second data flow occur within a predetermined time period.

18. The computer-readable storage media of claim 15, wherein the computer-executable instructions further cause the at least one processor to:
- for each dependency set, calculate a difference between the start time of the first data flow and the start time of the second data flow;
- determine a plurality of equivalent data flow sets based on dependency sets where the source, the destination, and the service of each of the first flows is the same as the source, the destination, and the service of a first flow of each of the plurality of equivalent data flow sets; and
- calculate the dependency strength for the plurality of equivalent data flow sets based on the calculated differences in start time of each equivalent data flow set.

19. The computer-readable storage media of claim 15, wherein the computer-executable instructions further cause the at least one processor to:
- receive a plurality of service score sets, wherein each service score set of the plurality of service score sets includes a relevancy score for each data flow based on an associated service; and
- for each first data flow, calculate a total service score based on the dependency sets associated with that first data flow.

20. The computer-readable storage media of claim 15, wherein the computer-executable instructions further cause the at least one processor to calculate a service flow rank for each dependency set based on the associated total service score and the dependency strength of the dependency set.

* * * * *